United States Patent [19]

Wood

[11] 4,058,025

[45] Nov. 15, 1977

[54] COUNTERWEIGHT ASSEMBLY

[76] Inventor: Charles A. Wood, 5539 Whispering Creek, Houston, Tex. 77017

[21] Appl. No.: 587,358

[22] Filed: June 16, 1975

[51] Int. Cl.² .................... F16F 15/22; F16F 15/28
[52] U.S. Cl. ................................ 74/573 R; 228/57; 16/DIG. 8
[58] Field of Search .................. 228/57; 73/480, 487; 74/573 R, 574, 603, 604; 301/5 B; 29/1, DIG. 1; 16/1 R, DIG. 8

[56] References Cited

U.S. PATENT DOCUMENTS

| 444,081 | 1/1891 | Wright | 74/573 |
|---|---|---|---|
| 525,799 | 9/1894 | Rymes | 74/573 |

Primary Examiner—James L. Jones, Jr.
Assistant Examiner—K. J. Ramsey
Attorney, Agent, or Firm—Craig W. Walford

[57] ABSTRACT

An adjustable counterweight assembly for exerting a torque on a rotatable tubular member. A weight carriage is mounted with a frame of the counterweight for radial movement with respect to the tubular member, and an adjusting assembly moves the weight carriage radially to vary the torque exerted on the tubular member. To mount the counterweight with the tubular member, a plurality of plates, each of which has a substantially regular arcuate surface, are affixed to the counterweight frame to engage the uniform outer surface of the tubular member. A mounting assembly detachably secures these arcuate surfaces to the tubular member.

10 Claims, 4 Drawing Figures

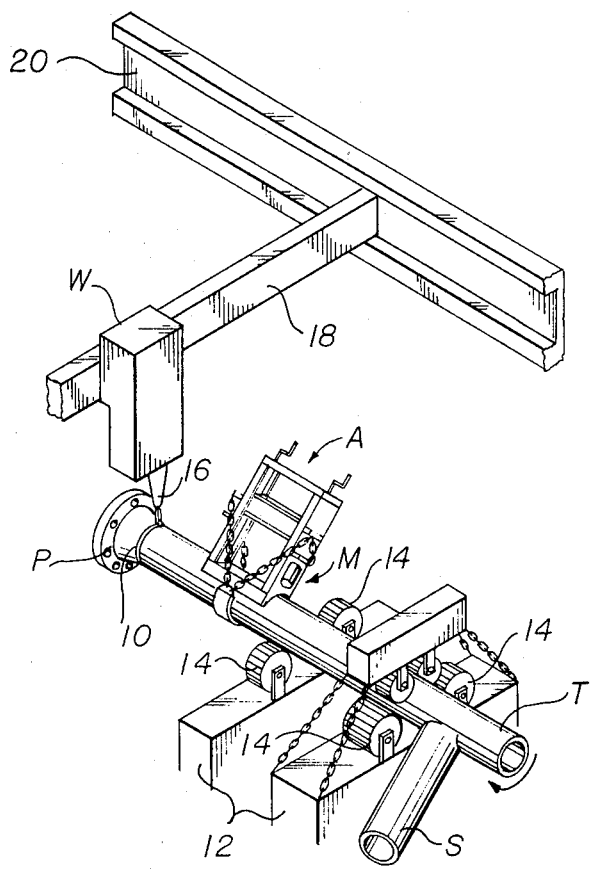
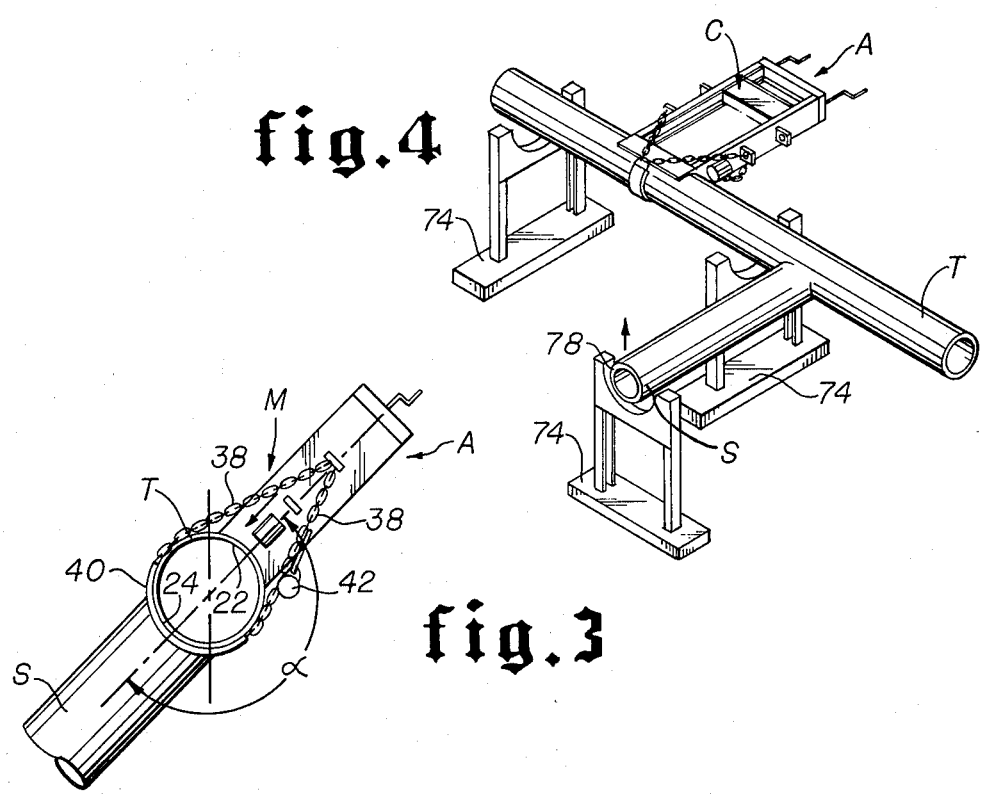

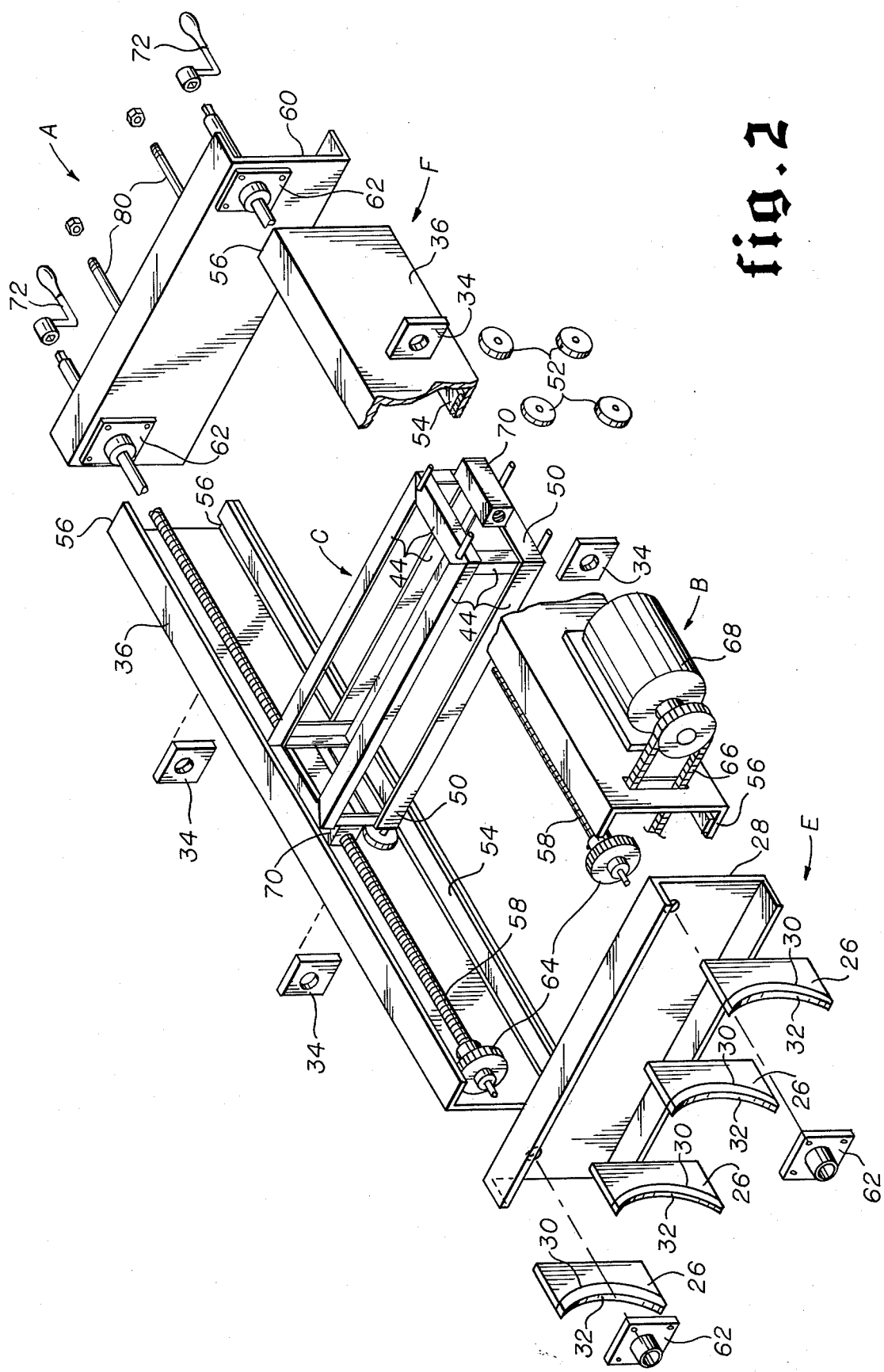

COUNTERWEIGHT ASSEMBLY

BACKGROUND OF THE INVENTION

The field of this invention is counterweight assemblies.

In pipe welding it is very desirable to use automatic welding machines to weld a joint between two tubular members. The joint is positioned at a desired distance from the welding tool of the automatic welder, and then the tubular members are rotated about a substantially stationary axis so that each portion of the joint to be welded passes by the welding tool at the desired distance from the welding tool. If the welding machine is functioning properly and the spacing between the joint to be welded and the welding tool is maintained substantially constant throughout the rotation of the tubular members, the welding machine forms a much more uniform and reliable weld than can be achieved through manual welding.

In the past, however, it was difficult and sometimes uneconomical to use automatic welding machines when one of the tubular members involved in the welding had a segment with an angular or arcuate configuration extending from the main body of the tubular member. As the tubular member was rotated, the angular segment exerted a toque on the main body of the tubular member and caused the tubular member to lope or otherwise deviate from its intended axis of rotation. As a consequence, the spacing between the joint to be welded and the welding tool varied as the tubular member rotated, preventing the formation of an acceptable weld.

Prior attempts to offset the undesirable torques during rotation of tubular members having angular or arcuate segments were not completely satisfactory. Frequently, pieces of scrap metal were welded to the main body of the tubular member to offset the undesirable torques. There were several drawbacks to this approach. First, the amount of scrap metal welded on to the main body of the tubular member was determined on a trial and error basis. After some scrap metal was welded on to the main body of the tubular member, the tubular member was rotated to see if that amount of scrap metal was sufficient to offset the undesirable torques. If too much scrap metal had been welded on the tubular member, some of the scrap metal had to be removed with a cutting torch, chisel, or other means. If too little scrap metal had been welded on the main body of the tubular member, additional welding of the scrap metal was required. This trial and error application of scrap metal was frequently time consuming and uneconomical. In addition, all of the scrap metal was eventually removed from the main body of the tubular member. Thus, the welds attaching the scrap metal to the tubular member had to be broken. Further, for some specialized uses of the tubular members, the irregularities in the outer surface of the tubular member caused by the removal of the scrap metal had to be filled with weld material or other suitable materials. Then this filling material had to be smoothed so that the tubular member would have a uniform outer surface.

Known counterbalancing assemblies, such as those described in U.S. Pat. Nos. 1,678,286 and 1,770,601, did not provide a viable alternative to this scrap metal approach. These counterbalancing assemblies were not readily mountable on the uniform outer surface of the tubular member. Rather, they required a keyed mounting structure incorporated into the tubular member as well as the counterbalance system to secure the counterweight against rotational movement with respect to the shafts with which they were mounted. In addition, while such assemblies were purportedly adjustable, the extent of adjustment was limited in some of the devices. Further, when large counterbalancing torques were required, adjustment of such assemblies required a great deal of effort.

Because of the deficiencies with such prior attempts to offset the undesirable torques occuring during rotation of tubular members having angular or arcuate sections, welds involving such members were frequently accomplished manually. However, as noted above, the manual welds were not as consistantly uniform and reliable as those formed by automatic welding machines. As a result, commercial specifications often required that a very high percentage of these manual welds be X-rayed or otherwise inspected to determine whether the welds were fully satisfactory. If not, of course, the tubular members had to be rewelded, but even if the welds were satisfactory, considerable expenditures for equipment and labor to inspect those welds were necessary.

SUMMARY OF THE INVENTION

It is an object of this invention to provde a new and improved counterweight assembly adapted for use with rotatable tubular members. The counterweight assembly of the present invention includes structure permitting the assembly to be mounted with a tubular member which is rotated during pipe welding operations. The assembly includes a frame having a base and a pair of side panels. An engaging means, such as a plurality of plates, is mounted with the base of the frame for engaging the outer surface of the tubular member. The engaging plates are held iin contact with the outer surface of the tubular member by mounting means which is detachably secured to the frame side panels and extends around the tubular member. The mounting means exerts a force on the frame which draws the plates toward the tubular member and ensures contact between the engaging plates and the outer surface of the tubular member. The engaging plates frictionally engage the outer surface of the tubular member to secure the counterweight assembly against movement with respect to the tubular member as it rotates during welding operations. Each of the engaging plates has a regular arcuate surface to provide a common surface area between the engaging plates and the outer surface of the tubular member. Preferably, each of the engaging plates includes a frictional pad mounted on the arcuate surface of the engaging plate so that the frictional forces between the engaging plates and the outer surface of the tubular member are enhanced. With the engaging plates frictionally engaging the outer surface of the tubular member and the mounting means securing the engaging plates with that tubular member, the counterweight of the present invention is mounted on the tubular member without marring or otherwise damaging the smooth outer surface of the tubular member. The enlarging plates frictionally engage the outer surface of the tubular member and do not require a keyed mounting assembly extending into both the counterweight assembly and the tubular member. Further, because the mounting means is detachable, the counterweight assembly may be readily removed from the tubular member when welding operations have been completed.

A weight carriage is mounted with the counterweight frame to provide a housing and a movable carriage for the counterweight used with the assembly with the present invention. The weight carriage is mounted for radial movement with respect to the tubular member. An adjusting means, which is also mounted with the frame, is provided to move the weight carriage radially with respect to the tubular member and thereby vary the torque exerted on the tubular member by the counterweight. Preferably, the adjusting means includes a plurality of screw shafts which threadedly engage receiving blocks mounted with the carriage assembly to move the carriage assembly upon rotation of the screw shafts. A motor or other suitable drive means may be provided to rotate these screw shafts with a minimum of effort. With this structure, the counterweight assembly of the present invention is readily adjustable so that undesirable torques caused by angular or arcuate segments of the tubular body may be precisely offset with minimum expenditures of time, money, and man power.

BRIEF DESCRIPTION OF THE DRAWINGS

FIG. 1 is a perspective view of the counterweight assembly mounted with a tubular member for welding operations.

FIG. 2 is an exploded perspective view of the counterweight assembly of the present invention.

FIG. 3 is an end view of a tubular member illustrating the mounting of the counterweight assembly of the present invention.

FIG. 4 is a perspective view showing suitable apparatus for initial adjustment of the counterweight assembly of the present invention.

DETAILED DESCRIPTION OF THE PREFERRED EMBODIMENT

In the drawings, the letter A designates generally the counterweight of the present invention which includes a frame F having a mounting means M and an engaging means E mounted with the frame F to detachably secure the assembly A to the outer surface of a rotatable tubular member T. A weight carriage C is movably mounted with the frame F, and an adjusting means B moves the weight carriage C radially with respect to the tubular member T to vary the torque exerted on the tubular member by the assembly A. By use of the adjusting means B, the torque exerted on tubular member T by the assembly A is adjusted to offset the undesirable torque imposed upon the tubular member T due to the movement of an arcuate or angular segment S of tubular member T. The undesirable torques from angular segment S would normally cause the axis of rotation of tubular member T to be unstable, but with assembly A offsetting these undesirable torques, the tubular member T has a substantially stationary axis of rotation. Thus, assembly A provides a structure for stabilizing the axis with rotation of the tubular member T so that an automatic welding machine W may be employed to weld additional pipe attachments or segments P to the tubular member T.

Considering the invention in more detail, FIG. 1 illustrates counterweight assembly A mounted with a tubular member T for welding operations in which a joint 10 between tubular member T and a flange or other pipe section P is to be welded by an automatic welder W. Tubular member T is mounted on a stand 12 having a plurality of rollers 14 to support the tubular member at a desired elevation. Pipe section P is tack welded or otherwise temporarily affixed to tubular member T so that the section P is also supported by the rollers 14. Once tubular member T is mounted on rollers 14, a weld tool 16 of welder W is positioned over joint 10. Typically, welder W is mounted with a manipulator arm 18 and is movable along the arm 18. The manipulator arm 18, in turn, is mounted with a chammel member 20 for movement parallel to the longitudinal axis of the channel member 20. Thus, by adjusting the position of manipulator arm 18 along channel member 20 and welder W along manipulator arm 18, the weld tool 16 is readily positionable over joint 10.

During welding operations, weld tool 16 remains in a stationary position, and tubular member T is rotated so that the entire joint 10 is exposed to weld tool 16 and tubular member T is welded to pipe section P. One or more of the rollers 14 may be provided with a drive system to rotate the roller and thereby impart this rotational movement to tubular member T. During rotation of tubular member T, it is necessary that the positioning between joint 10 and weld tool 16 remain substantially constant. If joint 10 is positioned either too close or too far away from weld tool 16 during any portion of the rotational movement, a proper weld will not be formed at joint 10. In other words, it is necessary that tubular member T has a substantially stationary or constant axis of rotation throughout the welding operation. However, during rotation of tubular member T undesirable torques are exerted on the tubular member T due to the rotational movement of the angular section S of the tubular member T. If the torques exerted by the angular segment S are not counter balanced, the axis of rotation of tubular member T tends to deviate as the tubular member rotates. That is, unless countered, these undesirable torques from angular pipe section S cause the tubular member T to lope, wobble, or otherwise deviate from its intended axis of rotation and prevent an acceptable weld from being formed at joint 10. However, counterweight assembly A, when mounted with tubular member T, offsets these adverse torques due to the rotational movement of angular pipe section S and thereby stabilizes the axis of rotation of tubular member T so that an acceptable, uniform weld is formed at joint 10.

The torque exerted on tubular member 10 by counterweight assembly A results from the gravitational force of weight (not shown) radially spaced from tubular member 10 transmitted through the counterweight frame F to the outer surface of the tubular member. To ensure that the counterweight torque is directly opposite the torque exerted on the tubular number by angular section S, the counterweight assembly A is mounted on the periphery of tubular member T at a position 22 diametrically opposing and longitudinally spaced from the peripheral section at which the angular pipe section S joins the tubular member T. That is, the angle shown in FIG. 3 is substantially 180°. In this mounted position, the torque exerted on the tubular member T due to the weight and weight carriage C is opposite the torque exerted on the tubular member T by the angular pipe section S.

To maintain the counterweight assembly A in this mounted position opposite angular pipe section S, the conterweight assembly A includes a mounting means M and an engaging means E to mount the counter weight assembly A with the outer surface 22 of the tubular member T. The engaging means E frictionally engages the peripheral section 22 of the tubular member T and secures the counterweight assembly against circumferential movement with respect to the tubular member T. The engaging means E may include a plurality of engaging plates 26, each of which has a substantially regular arcuate surface 30. That is, while surface 30 may take any of a number of desired geometrical shapes, such as circular, hyperbolic, cycloidal, or other shapes, it substantially conforms to that shape over the entire surface 30 and contains no grooves or slots such as those necessary to accommodate keyed mounting systems or the like. The surfaces 30 illustrated in FIG. 2 are partial circular surfaces which conform to the shape of the outer surface of the tubular member T (FIG. 3). Preferably, a plurality of friction pads 32 which are made of rubber or other suitable material having favorable frictional characteristics are mounted on the surfaces 30 of engaging plates 26 by counter sunk bolts or other suitable means and conform to the arcuate shapes 30 of the engaging plates. These friction pads engage the peripheral portion 22 of the tubular member T and enhance the friction between the engaging means and the tubular member T to ensure that the counterweight assembly A does not slip on the smooth outer surface of the tubular member T.

To hold these friction pads 32 firmly in contact with the peripheral section 22 of tubular member T, counterweight assembly A is provided with a mounting means M. The mounting means M includes a plurality of the mounting lugs 34 welded or otherwise suitably affixed to opposing side panels 36 of counterweight frame F. A plurality of chain members 38 (FIG. 3) join at least one of the mounting lugs 34 on the side panels 36 of counterweight frame F and extend to a mounting pad 40 which extends around the tubular member T directly opposite the peripheral portion 22 of the tubular member T upon which the assembly A is mounted. A come-a-long 42 is included in one of the chain members 38 connected to the lug members 34 so that the chain members 38 may be drawn taut around the tubular member T. When drawn taut by the come-a-long 42, the mounting means M exerts force radially inward as shown by the arrow in FIG. 3 to ensure that the friction pads 32 on engaging plates 26 are firmly secured in contact with the peripheral section 22 of tubular member T. As can be understood, counterweight assembly A may be readily removed from tubular member T merely by loosening the come-a-long 42. However, with the chain members 38 drawn taut by come-a-long 42, counterweight assembly A is secured against radial movement with respect to the tubular member T by the mounting means M and is further secured against rotational movement with respect to the tubular member T by the frictional engagement of friction pads 32 with the periphery 22 of the tubular member T. As previously described and as illustrated in FIG. 3, when counterweight assembly A is in its mounted position the counterweight assembly exerts a torque on the tubular member T directly opposite the torque exerted by the angular pipe section S. The gravitational forces attributable to weights in weight carriage C exert a force which is transmitted through counterweight frame F and engaging means E to the tubular member T. To ensure that the torque exerted by counterweight assembly A is equal in magnitude to the torque exerted by the angular pipe section S, weight carriage C is movably mounted with the counterweight frame F. As the weight carriage C is moved radially away from the tubular member T, the torque exerted by the counterweight assembly A is increased. Conversely, as the counterweight assembly C is moved inwardly toward the tubular member T the torque exerted by counterweight assembly A is reduced. An adjusting means B is provided with the counterweight assembly and mounted with counterweight frame F to facilitate the movement of the weight carriage C.

As best seen in FIG. 2, weight carriage C includes a plurality of angle irons 44 or other suitable members welded or otherwise joined together to form a housing for supporting weights within the counterweight frame F. At opposing sides 50 of the counterweight C a plurality of rollers 52 are mounted with the angle irons 44 for a rotational movement with respect to the weight carriage C. The rollers at each side 50 of weight carriage C come into rolling engagement with guide rails 54 mounted on each inwardly extending channel member 56 of each side panel 36 of counterweight frame F. The rollers 52 roll along these guide rails 54 to facilitate movement of weight carriage C in response to the adjusting means B.

The adjusting means B includes a pair of screw shafts 58, each of which is mounted adjacent one of the side panel members 36 of counterweight frame F. The screw shafts extend through both the base 28 and a top 60 of the frame F. At both the top 60 and the base 28 of the frame F, the screw shafts are joined with the frame members by bearing assemblies 62 to allow rotational movement of screw shafts 58. To provide a means for easily rotating each screw shaft 58, a sprocket 64 is mounted on each of the screw shafts 58 near the base 28 of frame F. Each sprocket 64 receives a chain drive member 66 which is also connected to a motor 68 to provide a drive means for rotating the sprocket 64. Preferably, of course, the sprockets 64 are identical in structure so that each screw shaft 58 is rotated an equal amount in response to a given movement of a chain drive member 66. It should be understood, however, that any suitable drive means, such as a hydraulic system, could be employed with apparatus A to rotate screw shafts 58.

To control the position of weight carriage C by rotation of screw shafts 58, each of the screw shafts 58 extends into threaded engagement with a receiving block 70 mounted at a side of a weight carriage C. Accordingly, when screw shafts 58 are rotated, a force is exerted on weight carriage C through receiving blocks 70 to roll the weight carriage C along guide rails 54. The direction of movement of weight carriage C depends, of course, on the direction of rotation of the screw shafts 58. It should also be noted that in addition to providing a means for moving the weight carriage C, screw shafts 58 of adjusting mans B provide a means for holding the weight carriage C in place. When screw shafts 58 are not rotated, the threaded engagement between the screw shafts and the receiving blocks holds the weight carriage C stationary with respect to counterweight frame F.

If desired, hand cranks 72 may also be provided at one end of the screw shafts 58 to manually rotate the screw shafts in the event of a failure of motor 68 or any other type of drive means provided.

The mounting and adjustment of counterweight assembly A can best be understood with reference to FIG. 4. Tubular member T, including the angular pipe section S is mounted on a plurality of stands 74 to support the tubular member T and the angular pipe section S. Counterweight assembly A is then mounted on tubular member T at the peripheral section 22 of tubular member T. Preferably, prior to mounting the counterweight assembly, weight carriage C is moved toward the base 28 of the counterweight frame so that the assembly initially exerts a minimum torque on the tubular member T. Subsequent to the mounting of the counterweight assembly A, weight carriage C is moved radially outward from the tubular member T until an end portion 78 of angular pipe section S moves slightly upward. With weight carriage C in this position, the counterweight A balances and offsets the weight of angular pipe section S. Thus, with tubular member T mounted on the wheels 14 of stands 12 (FIG. 1) for rotation during welding operation, counterweight assembly A counters the undesirable torques from pipe section S exerted on tubular member T during rotation of the tubular member. With the undesirable torques from the angular pipe section S countered, tubular member T has a substantially constant axis of rotation, and joint 10 is maintained at the desired distance from weld tool 16 throughout the welding operations. Accordingly, a uniform, reliable weld is formed with an automatic welding machine through the use of counterweight assembly A.

It should be noted that the counterweight assembly A is securely mounted on the tubular member T despite the fact that the outer surface of the tubular member T is substantially uniform and smooth. No keyed mounting mechanisms or other means extending into both the tubular member and the counterweight assembly are necessary to secure the counterweight assembly A with the tubular member T. In addition, the counterweight assembly A does not mar the outside surface of tubular member T. Mounting pad or cushion 40 which extends around the tubular member is preferably formed of a steel reinforced rubber material which has sufficient strength to mount the counterweight assembly A and yet does not mar the outer surface of tubular member T. Further, counterweight assembly A is readily adaptable for use is successive welding operations. The assembly A is readily mounted with the tubular member T and is also easily detachable. Once mounted, it is readily adjustable to various positions to counter different torques exerted by various angular pipe sections S. If desired, assembly A may also be provided with weight bolts 80 mounted on the top 60 of the counterweight frame F to receive weights in addition to those in weight carriage C to even further increase the torque which may be exerted on a tubular member by the counterweight assembly A. Preferably, assembly A, except as otherwise noted above, is constructed of steel, but any other material capable of withstanding and transmitting the forces encountered during operation of the assembly may be used. Accordingly, the use of additional weights at the top 60 of frame F does not interfere with the effective operation of assembly A, but simply increases the torque which may be exerted on tubular member T by the assembly A.

It should also be understood that while counterweight assembly A finds particular utility in use with tubular members, the assembly A is suitable for use anywhere a counterweight assembly is needed. In addition, although the description set forth above shows its use with a tubular member having a single angularly extending segment S the counterweight assembly A may be used with tubular members having a plurality of angular segments.

The foregoing disclosure and description of the invention are illustrative and explanatory thereof, and various changes in the size, shape, and material as well as in the details of the illustrated construction may be made without departing from the spirit of the invention.

I claim:

1. An adjustable counterweight assembly for use with a rotatable tubular member, comprising:
   a frame;
   engaging means mounted on said frame and having a substantially regular arcuate surface for engaging the outer surface of the tubular member;
   clamping means detachably mounted to said frame and extendable around the tubular member for detachably securing said engaging means to the outer surface of tubular member;
   weight carriage means including a weight receptacle mounted on said frame for radial movement with respect to the tubular member; and
   adjusting means mounted on said frame for moving said weight carriage radially with respect to the tubular member.

2. The structure set forth in claim 1, wherein said engaging means includes:
   plate means having a substantially regular arcuate surface.

3. The structure set forth in claim 2, wherein said engaging means further includes:
   friction pad means mounted on said arcuate surface of said plate means for frictional engagement with the outer surface of the tubular member.

4. The structure set forth in claim 1, wherein said assembly includes:
   carriage guide rails mounted on said frame; and
   rollers mounted on said weight receptacle for rolling engagement with said guide rails so that said weight receptacle is movably mounted on said frame.

5. The structure set forth in claim 4, wherein said frame includes:
   a top member spaced from said engaging means; and
   weight receiving shafts mounted on said top member.

6. The structure set forth in claim 1, wherein said adjusting means includes:
   a plurality of threaded screw shafts rotatably mounted on said frame; and
   a plurality of receiving blocks mounted on said weight carriage means, each of said receiving blocks being in threaded engagement with one of said screw shafts whereby said weight carriage means is moved in response to rotation of said screw shafts.

7. The structure set forth in claim 6, wherein said adjusting means includes:
   drive means for rotating said screw shafts.

8. The structure set forth in claim 7, wherein said drive means includes:
   a plurality of sprockets, each of said sprockets being mounted on one of said screw shafts;
   a motor; and
   a drive chain operably connected to said sprockets and to said motor for rotating said sprockets and said screw shafts mounted therewith.

9. The structure set forth in claim 7, wherein said drive means includes:
   a plurality of cranks, each of said cranks being detachably mounted on one of said screw shafts.

10. The structure set forth in claim 1, wherein said clamping means further includes:
    mounting lugs mounted on said frame; and
    a cushion mounted between said connecting means and said tubular member.

* * * * *